United States Patent [19]
Pospiech et al.

[11] Patent Number: 6,071,642
[45] Date of Patent: Jun. 6, 2000

[54] METHOD FOR MANUFACTURING A BATTERY COVER WHICH IS AT LEAST PARTIALLY ELECTRICALLY CONDUCTIVE

[75] Inventors: Gerhard Pospiech, Brilon; Eberhard Nann, Soest-Deiringsen; Hermann Hester, Brilon; Werner Hampe, Helminghausen; Franz-Josef Kohaupt, Marsberg, all of Germany

[73] Assignee: Accumulatorenwerke Hoppecke, Germany

[21] Appl. No.: 09/103,660

[22] Filed: Jun. 24, 1998

[30] Foreign Application Priority Data

Jun. 24, 1997 [DE] Germany .............................. 197 26 742

[51] Int. Cl.[7] .................................................. H01M 2/04
[52] U.S. Cl. .......................... 429/175; 29/623.1; 29/623.5
[58] Field of Search ..................... 429/163, 175; 29/623.1, 623.3, 623.5

[56] References Cited

U.S. PATENT DOCUMENTS 4,376,156  3/1983  Wheadon .............................. 429/160

FOREIGN PATENT DOCUMENTS

| 4118388 | 1/1992 | Germany . |
| 9301684 | 8/1993 | Germany . |
| 4232961 | 4/1994 | Germany . |
| 4407508 | 9/1995 | Germany . |
| 19517338 | 11/1995 | Germany . |
| 4432966 | 3/1996 | Germany . |
| 2-67114 | 3/1990 | Japan . |
| 2-139216 | 5/1990 | Japan . |
| 3-124414 | 5/1991 | Japan . |
| 3-184815 | 8/1991 | Japan . |
| 6-91693 | 4/1994 | Japan . |

OTHER PUBLICATIONS

T. R. Crompton, Battery Reference Book, second edition, Reed Educational and Professional Publishing Ltd, Boston (1996) p. 4/4, 1996.
"Kunststoffe", 1995; pp. 908–909, vol. 85, no month.
"Kunststoffe", 1995; pp. 910–912, vol. 85, no month.
"Plastverarbeiter", 1997; pp. 30–34, vol. 48, no month.

*Primary Examiner*—Maria Nuzzolillo
*Assistant Examiner*—Susy Tsang
*Attorney, Agent, or Firm*—Robert W. Becker & Associates

[57] ABSTRACT

A method for manufacturing a battery cover includes applying electrically conducting elements to at least a portion of a surface of the cover so as to span the surface. The electrically conducting elements are connected to one another and to at least one of the battery poles for dissipating electrical charge.

20 Claims, 2 Drawing Sheets

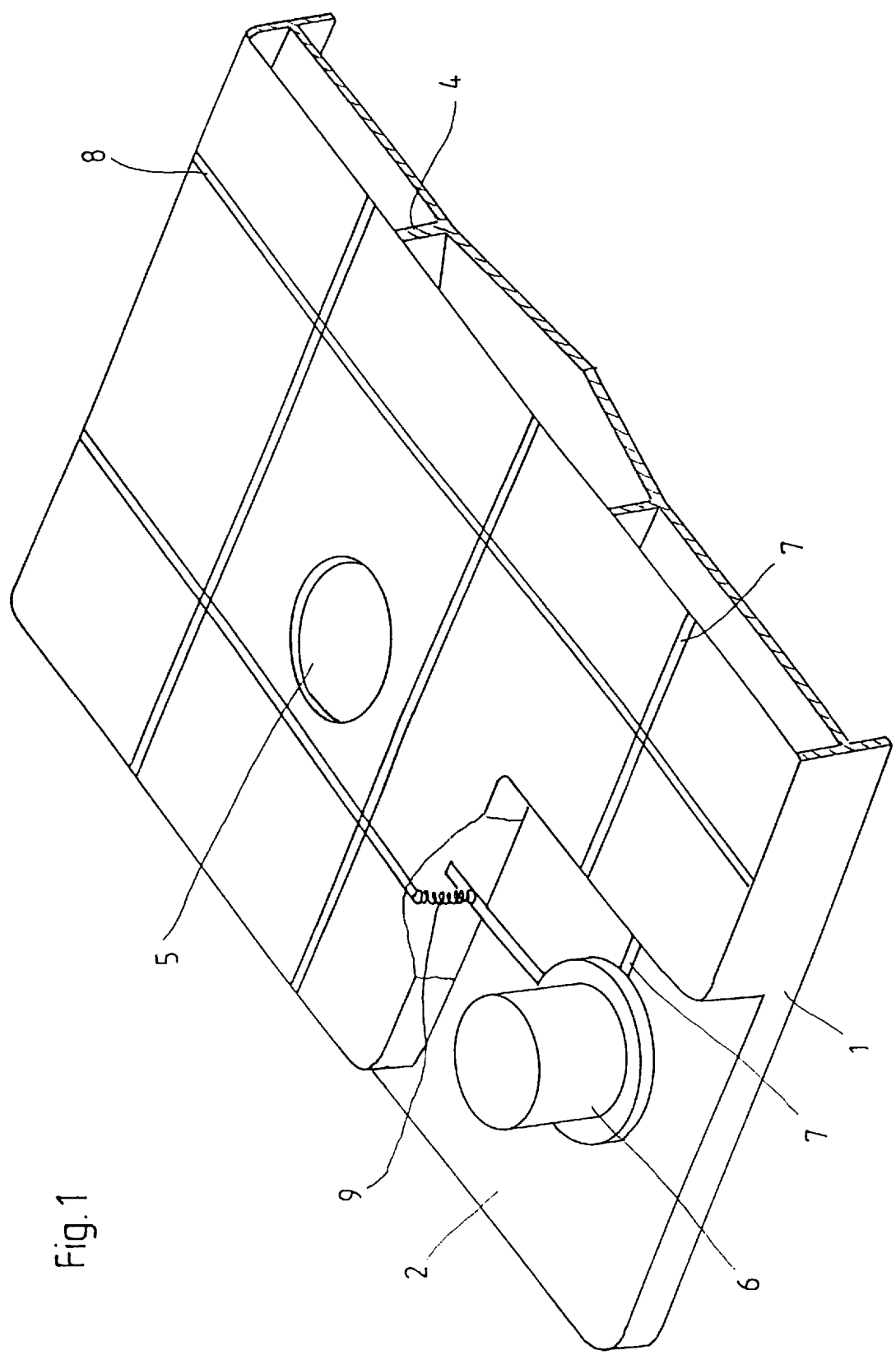

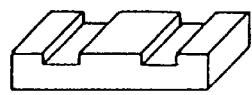
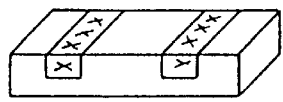
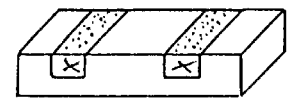
Fig. 2a                Fig. 2b                Fig. 2c
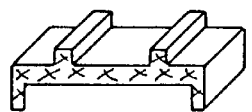
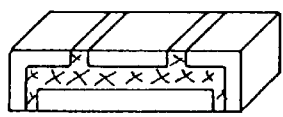
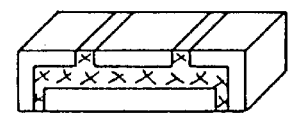
Fig. 3a                Fig. 3b                Fig. 3c

METHOD FOR MANUFACTURING A BATTERY COVER WHICH IS AT LEAST PARTIALLY ELECTRICALLY CONDUCTIVE

BACKGROUND OF THE INVENTION

The present invention relates to a method for manufacturing a battery cover which is at least in portions thereof electrically conductive. Furthermore, the invention also provides a novel battery cover with electrically conducting properties. The invention also relates to a novel battery with electrically conducting battery cover whereby in the area of the interior of the cells the cover is non-conducting.

Batteries, conventionally lead/acid batteries, are dangerous in that, due to the charge process, oxygen and hydrogen gases are formed which can collect within the cell chamber below the cover and may cause explosions by electrostatic fields. Electrostatic fields can be produced, on the one hand, directly at the surface of a plastic cover, comprised, for example, of polypropylene, by rubbing with a rag; on the other hand, they can be produced by potential fields and spark formation at the cover. There is a need, even a requirement, for avoiding such explosions by dissipating the charges or by providing a defined resistance. When a material is chosen for the cover that has a resistance of equal to or less than $10_4 \Omega \times cm$, no electrostatic fields will be produced. However, between the two poles of a battery/cell, according to Ohm's law, a current within the amperage range of, for example, 12 volt will result which causes continuous discharge of the battery. Such a discharge current (self discharge of the battery) requires a minimal resistance of $10^5 \Omega \times cm$. If necessary, it would be possible to isolate one of the poles of the battery relative to the plastic material; however, this leads to additional costs. Furthermore, this cannot ensure avoidance of explosions.

It is therefore an object of the present invention to provide a method for manufacturing a battery cover which can be performed in an economic and simple manner and which allows the manufacture of a battery cover with electrically conducting properties, preferably, by combining non-conductive plastic materials with electrically conducting elements.

SUMMARY OF THE INVENTION

As a technical solution to this problem, the invention suggests a method for manufacturing a battery cover in which the cover is provided at least in portions of its surface with electrically conducting elements bridging the surface. They are connected to one another and are also connected to at least one pole for dissipating electrical charge.

The inventive method is simple and economic. It can be integrated in already realized manufacturing processes for battery covers. In a simple manner a battery which, as is conventional, is produced of non-conducting plastic material is provided with electrically conducting elements.

The electrically conducting elements can form a complete and continuous layer, for example, by employing a foil, a coating of conductive lacquer etc. But it is also possible to only cover portions of the surface and, according to a preferred embodiment of the invention, to provide a grid or network of electrically conducting elements spanning the surface of the battery cover.

In addition to foils, conductive lacquers etc., it is also possible to employ conventional conductive leads, for example, flat wires.

The embodiment of the electrically conducting surface can be such that the surface of the battery cover is coated by applying a foil, by coating with a conductive lacquer, by hot imprinting methods etc. Foil and lacquer as well as electrical leads can be applied in strips onto the surface or can be introduced into already provided grooves. Conductive lacquer can also be applied in printing processes, for example, by serigraphy onto the surface of the cover.

According to an especially advantageous suggestion of the invention, the electrically conducting elements are produced during manufacture of the battery cover by injection-molding. In an advantageous manner, the injection-molding process can employ multiple components, whereby, for example, a component of a metalizable material or a conducting plastic material can be used and in a second injection-molding process step the battery cover can be applied in a complementing fashion.

In all disclosed method variations, the electrically conducting elements which are arranged in order to produce an interconnected lead network or a continuous conducting surface, are connected to ground. It is also possible that the battery cover forms a plurality of individual surface areas which are respectively connected to ground.

Advantageously, the ground is in the form of one of the poles of the batteries so that the electrically conducting elements are connected to one another and then finally to the selected pole. When applying the conductive lacquer, the pole can thus be partially coated also. It is sufficient when contact is provided between electrically conducting elements and the sleeve of the pole. Also, the pole can be provided with an additional pole ring for contacting.

When the battery cover has surfaces in different planes, which is often the case when the battery cover is comprised in a manner known per se of an upper portion and a lower portion, enclosing an acid return chamber, whereby, however, the plane of the poles is not covered by the upper portion, the electrically conducting elements are then pulled over the edges or are separately embodied in the different planes so that within the edge areas overlap results. In these overlapping edge areas, simple vertical contacting means can be provided, for example, in the form of respective bores with inserted springs whereby the bores are then closed tightly by caps, application of pins etc.

The disclosed method is suitable especially for a simple embodiment of electrically conducting surfaces of a battery. The surface treatment methods are very simple, but the surfaces are prone to be damaged or may not provide sufficient connection to the plastic surface of the battery cover. However, the inventive methods are an economic and simple solution of the aforementioned object. The embedding process and multi-component method fulfill the highest requirements with regard to stability, service life, scratching resistance and wiping resistance, acid resistance, secure fastening etc. They generally require new manufacturing devices.

According to an especially advantageous suggestion of the invention, when employing the two-component injection-molding method it is possible to employ propylene with a carbon black contents of greater than 13% instead of a plastic material which then must be metalized. A plurality of leads can thus be produced, for example, in three planes. The upper portion and the lower portion of the lid are then directly fused to one another whereby the leads formed in the upper portion and in the lower portion by incorporation of carbon black are positioned directly above one another so that they can be contacted.

The invention also provides a new type of battery cover which inventively is at least in portions thereof electrically conducting and provided with a discharge unit. With such a novel battery cover the aforementioned risk of explosions is completely avoided.

A battery provided with the inventive battery cover is also new and can be used in many applications. Especially important is the aspect that when used widely, for example, in motorized vehicles, it contributes to increased safety of such vehicles and safety in general.

BRIEF DESCRIPTION OF THE DRAWINGS

The object and advantages of the present invention will appear more clearly from the following specification in conjunction with the accompanying drawings, in which:

FIG. 1 is a schematic representation of a portion of a battery cover with electrical leads;

FIGS. 2a–2c show one embodiment of method steps for a multi-component manufacture; and FIGS. 3a–3c show an alternative embodiment to FIG. 2.

DESCRIPTION OF THE PREFERRED EMBODIMENTS

The present invention will now be described in detail with the aid of several specific embodiments utilizing FIGS. 1 through 3c.

FIG. 1 shows schematically a cover 1 of a lead/acid battery which in a manner known per se is comprised of a so-called lower cover portion 2 having chambers formed by non-represented stays to match the battery cells. Further stays 4 provide a return labyrinth for battery acid. Further stays, also not shown, provide an inlet opening 5 to the respective cells. The embodiment of the battery housing, respectively, of its cover itself is of minimal importance with respect to the present invention.

In a manner known per se, a battery pole 6 penetrates the cover. At another location a non-represented further battery pole penetrates the cover. By providing conductive areas which are connected with one of the poles, preferably, the negative pole, conduction, control, and dissipation of voltage or potentials is possible. Through the leads 7 and 8 a grid is formed whereby the leads, for example, are formed by printed conductive lacquer. In the transition area 9 from the upper cover portion to the lower cover portion of the cover, which are positioned in different planes, a bore is arranged in which an electrically conducting element, for example, a non-represented spring, a contact pin etc. is inserted. The lead 8 in the lower portion has a length such that it overlaps the lead 8 in the upper portion of the cover. Thus, when a contact element is inserted into the bore in the area 9, the leads are connected to one another. The bore can then be covered by a plastic cap, not represented in the drawing.

FIGS. 2 and 3 show embodiments for manufacturing the inventive covers for batteries in a multi-component injection-molding method.

According to FIG. 2a, in a first injection molding process, a so-called first shot, an initial injection-molded plastic part is produced. According to this embodiment, a non-metalizable plastic material is molded with grooves. According to FIG. 2b, in a second shot of the injection-molding process the finished injection-molded part is produced which has as a second component a metalizable material or a conductive plastic material, for example, PP with a carbon black contents of more than 13%. In the case of a metalizable material metalization takes place in a third process step.

In an alternative embodiment according to FIG. 3, the initial molded part is produced of a metalizable material (FIG. 3a). In the second shot of the injection-molding process, the finished injection-molded part is produced by embedding the initially produced injection-molded part in a non-metalizable plastic material. In the third step, according to FIG. 3c, metalization takes place when in the first step a non-conductive plastic material has been used.

The material combinations useful for the aforementioned processes are metalizable materials such as ABS, PEI, LCP, PES, PA66/6, PA6, PA66 and similar materials. As non-metalizable materials different combinations with the aforementioned metalizable materials can be used: PC, PE, PPS, PSF, PA11, PA12, POM etc.

Metalization can be performed without current or galvanically by employing copper, nickel, gold, tin etc.

With the aforementioned method it is possible to produce in a simple manner electrically conducting battery covers.

The specification incorporates by reference the disclosure of German priority document 197 26 742.4 of Jun. 24, 1997.

The present invention is, of course, in no way restricted to the specific disclosure of the specification and drawings, but also encompasses any modifications within the scope of the appended claims.

What is claimed is:

1. A method for manufacturing a battery cover, said method comprising the steps of:

applying electrically conducting elements to at least a portion of a surface of said cover so as to span the surface;

forming an electrical charge dissipating surface by connecting the electrically conducting elements exclusively to one another and to at least one battery pole for dissipating electrical charge.

2. A method according to claim 1, wherein said step of applying includes coating the surface with an electrically conducting layer to form the electrically conducting elements.

3. A method according to claim 1, wherein said step of applying includes coating the surface with leads of an electrically conducting material to form the electrically conducting elements.

4. A method according to claim 1, wherein said step of applying includes providing the surface with depressions and inserting electrically conducting material into said depressions to form the electrically conducting elements.

5. A method according to claim 1, wherein the electrically conducting elements consist of metal foil.

6. A method according to claim 1, wherein the electrically conducting elements consist of lead wire.

7. A method according to claim 1, wherein said step of applying includes arranging the electrically conducting elements in a grid.

8. A method according to claim 1, wherein the step of applying includes employing an electrically conducting lacquer for forming the electrically conducting elements.

9. A method according to claim 1, wherein the step of applying includes printing electrically conducting material onto the cover to form the electrically conducting elements.

10. A method according to claim 1, wherein the step of applying includes embedding the electrically conducting material into the cover during injection molding of the cover.

11. A method according to claim 1, wherein the step of applying includes injection-molding the cover from a plurality of components, wherein one component is embodied as an electrically conducting material.

12. A method according to claim 11, wherein one of the components is a metallizable component.

13. A method according to claim 1, further including the step of grounding the electrically conducting elements.

14. A method according to claim 13, wherein one of the battery poles is used for grounding.

15. A method according to claim 1, wherein the cover comprises multiple surface portions located in different planes and wherein the electrically conducting elements are positioned in said different planes and are connected at edges of the surface portions in said different planes so as to overlap and to be vertically connected.

16. A method according to claim 15, wherein the vertical connection is embodied by a bore and a contacting element inserted into the bore.

17. A method according to claim 16, wherein the contacting element is a spring.

18. A method according to claim 16, wherein the contacting element is a pin.

19. A battery cover having a surface and electrically conducting elements arranged on at least a portion of said surface so as to span said surface, said electrically conducting elements forming an electrical charge dissipating surface by being connected exclusively to one another and to at least one battery pole for dissipating electrical charge.

20. A battery including a battery cover having a surface and electrically conducting elements arranged on at least a portion of said surface so as to span said surface, said electrically conducting elements forming an electrical charge dissipating surface by being connected exclusively to one another and to at least one battery pole for dissipating electrical charge.

* * * * *